Dec. 19, 1922.
L. W. LEMKE.
PLANT BOX.
FILED NOV. 1, 1920.
1,439,426.
2 SHEETS—SHEET 2.
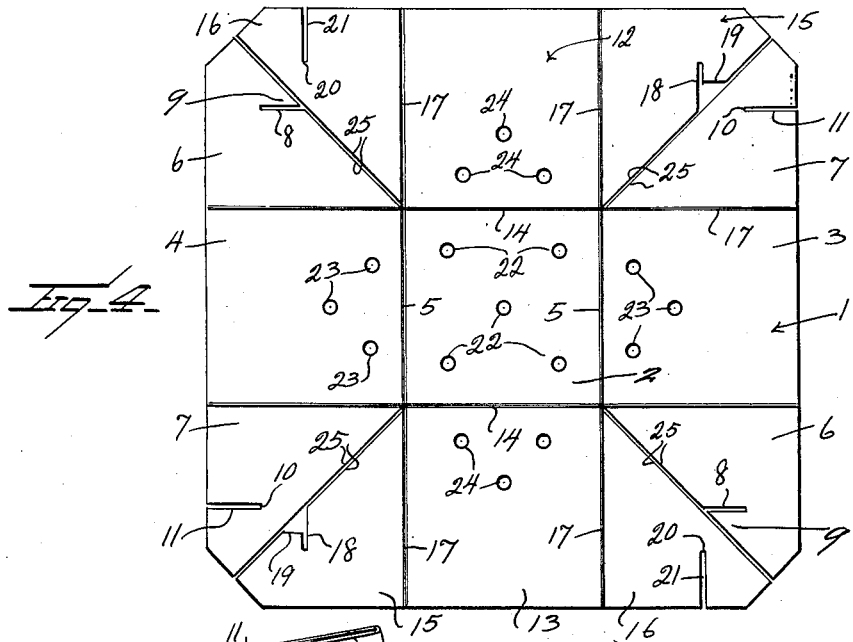
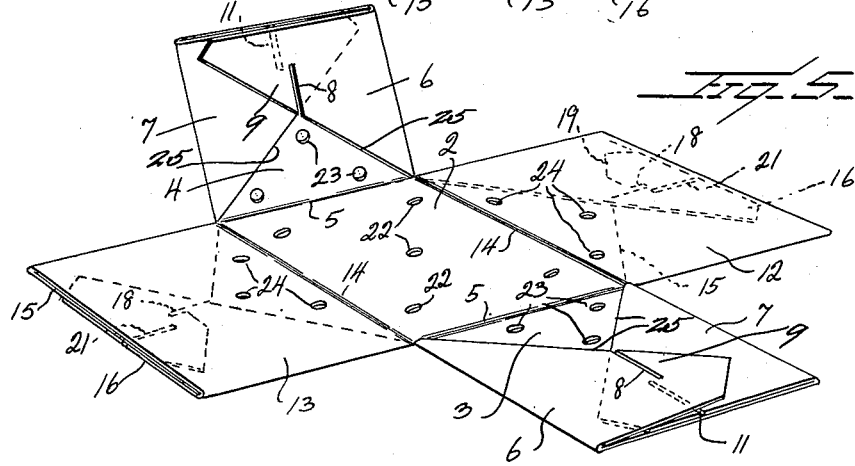
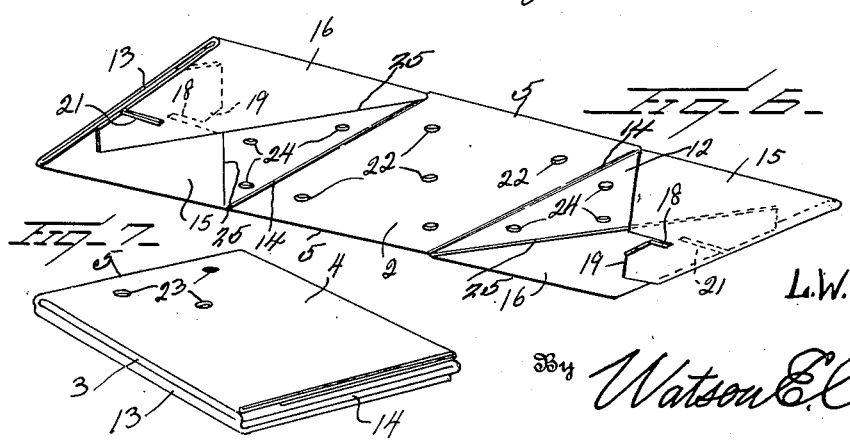
Inventor
L.W. Lemke
By Watson E. Coleman
Attorney Patented Dec. 19, 1922.

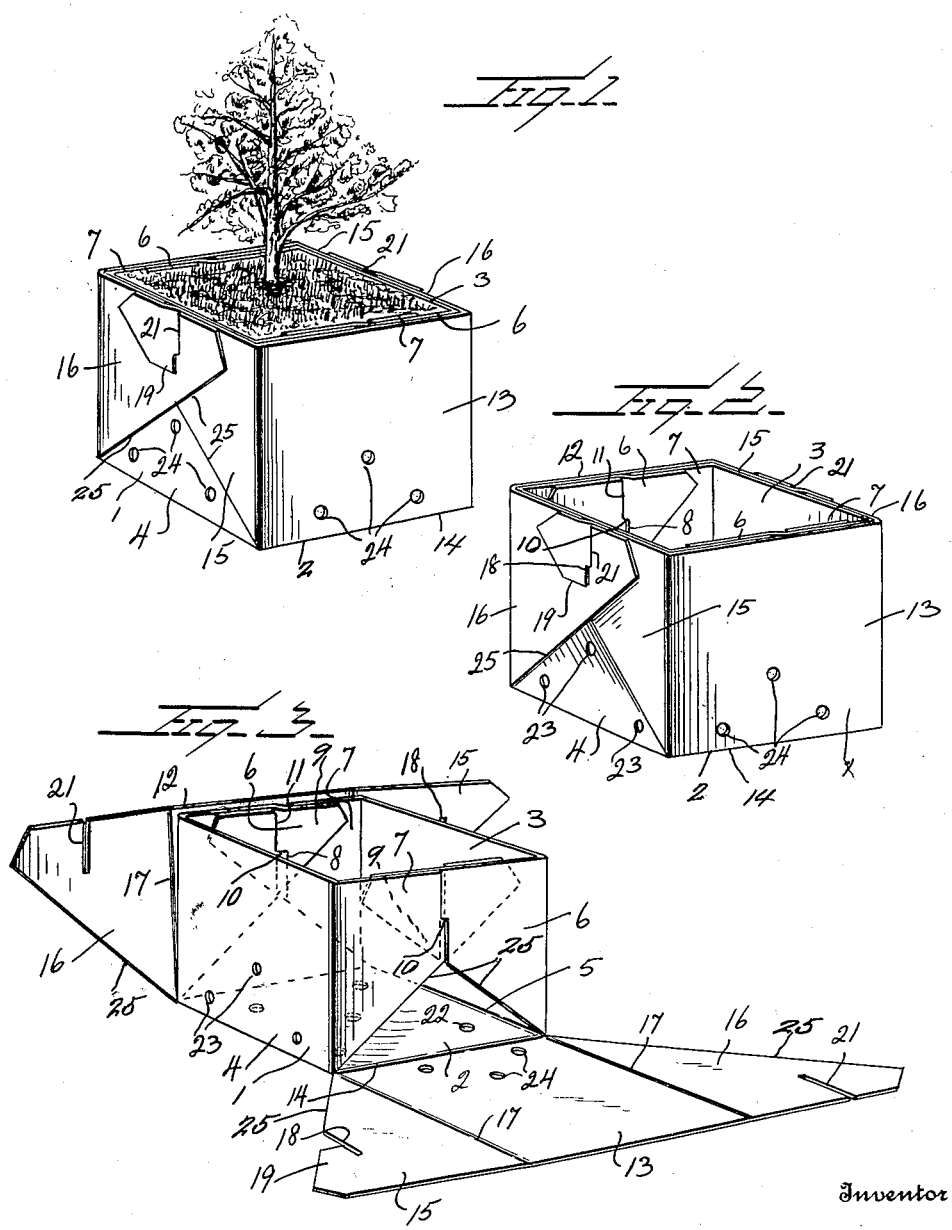

1,439,426

UNITED STATES PATENT OFFICE.

LEWIS W. LEMKE, OF CLIFF MINE, PENNSYLVANIA.

PLANT BOX.

Application filed November 1, 1920. Serial No. 421,114.

*To all whom it may concern:*

Be it known that I, LEWIS W. LEMKE, a citizen of the United States, residing at Cliff Mine, in the county of Allegheny and State of Pennsylvania, have invented certain new and useful Improvements in Plant Boxes, of which the following is a specification, reference being had to the accompanying drawings.
In plant boxes heretofore used, the roots of the plant are supposed, during their growth to break and grow through the walls of the box, and while they are tending to grow through the wall of the box, they become more or less root-bound for some time, hence retarding the growth of the plant.

The purpose of the present invention is the provision of a plant box to remain in perfect shape while the plants are growing before being transmitted to the field, and which will remain in substantially perfect shape when carrying them to and transplanting the box in the field.

Another purpose is to provide a plant box wherein the sides are hooked on all sides of the box, and furthermore the sides are of several thicknesses, owing to the overlapping connected together parts, thereby strengthening and reinforcing the box.
Still another purpose is the provision of a box, wherein the bottom and the lower central portions of the sides of which are provided with openings or apertures, to permit the roots to grow through the box readily, and without causing the roots to become root-bound.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.
In the drawings:—

Figure 1 is a view in perspective of the improved plant box constructed in accordance with the invention, showing the box as containing earth and a plant growing therein.

Figure 2 is a perspective view of the box, showing the same empty.

Figure 3 is a perspective view of the box showing certain of the sides connected, and the other sides disconnected.

Figure 4 is a plan view of a blank which forms the box.

Figure 5 is a perspective view showing the blank in a partly collapsed position.

Figure 6 is a perspective view showing another collapsed position of the blank.

Figure 7 is a view showing the blank completely collapsed so that a number of blanks fully collapsed may be compacted together in a small compass.

Referring to the drawings, 1 designates a blank which may be made of any suitable material preferably cardboard or the like, said blank being provided with a bottom portion 2, which may be any suitable shape preferably rectangular. In forming the blank, the side portions 3 and 4 are formed integrally with opposite edges of the bottom 2. These sides 3 and 4 may be folded on the scored lines 5, so that the sides 3 and 4 may extend upwardly from the bottom. Opposite edges of the sides 3 and 4 are provided with extensions 6 and 7, which are angular shape as shown. The extensions 6 have slots 8, causing hooks 9 to be formed. In folding the blank the slots 8 straddle the crotches 10 of the slots 11 of the extensions 7, thereby holding the sides 3 and 4 in upright positions, and relatively reinforce them.

Also in forming the blank sides 12 and 13 are formed integrally with the bottom 2 of the box, so that they may fold to upright positions upon the scored lines 14. It will be noted that the sides 12 and 13 overlap the extensions 6 and 7. The sides 12 and 13 have extensions 15 and 16, which as well as the extensions 6 and 7 are folded on the scored lines 17. The extensions 15 and 16 overlap the sides 3 and 4. The extensions 15 have slots 18 and adjoining hooks 19. The slots 18 are designed to straddle the crotches 20 of the slots 21 of the extension 16, thereby not only connecting the extensions 15 and 16, but also holding the sides 12 and 13 in upright positions. As previously stated the sides 12 and 13 overlie the extensions 6 and 7, while the extensions 15 and 16 overlie the sides 3 and 4, therefore in this way the plant box is considerably reinforced, and the rigidity thereof is sufficient to insure keeping the box in its proper shape, while the plant is growing, and when transplanting the plant.

The bottom 2 is provided with a plurality of apertures or openings 22, to permit of the escape of water when the plant is being watered, and also to permit the roots of the plant to expand and grow through the bottom of the box, when the plant has been transplanted.

The sides 3 and 4 and 12 and 13 are provided with openings or apertures 23 and 24, which also permit of the expansion and growth of the roots. For it has been found that in using the plant box, it is the aim to provide some means to permit the growth of the roots and to prevent the roots becoming root-bound.

The extensions 6 and 7 and 15 and 16 have diagonally disposed edges 25, therefore when the extensions are connected as shown in the drawings, only a single thickness of cardboard or other fibre material remains at the lower portions of the sides 3 and 4 and the hooks. When the extensions 6 and 7 are connected and the hooks 12 and 14 likewise connected, the extensions of certain sides of the blank do not overlap or overlie the openings 23 and 24, as these openings or apertures are formed in a single thickness of the side and the hooks, the roots of the plant are capable of growing through the sides, particularly through the openings thereof.

Attention is directed to the drawings, wherein the sides 3 and 4 are first turned down, the extensions 6 and 7 having first been folded upon the outsides of the sides, the sides 3 and 4 may be folded on one side of the bottom 2. The extensions 15 and 16 may then be folded on the opposite faces of the sides 12 and 13, thereby permitting the sides 12 and 13 to be folded upon one face of the bottom 2, as shown in Figures 5, 6 and 7. In this way the blank, from which plant boxes are formed may be packed in a very small compass.

In using this form of box, the sides 2 and 3 are first disposed in upright positions, and the extensions 6 are connected to the extensions 7 diagonally. The extensions 15 and 16 of the blank are then folded, and the sides 12 and 13 disposed in upright positions, in which case the various extensions may be hooked, and the box thereby formed for the reception of soil or earth, in which the plant may be planted.

The invention having been set forth, what is claimed as being useful is:—

As an article of manufacture, a plant box constructed from a single blank of cardboard or other material, comprising a bottom, the opposite edges of the bottom having sides to assume upright positions, the bottom, and each side adjacent where it integrally connects with the bottom having a plurality of openings to permit of the growth of the roots therethrough, triangular upright extensions integrally connected to the perpendicular opposite edges of each side, the triangular extensions of two of the sides being interconnected on and adjacent the inner faces of the other two sides, the triangular extensions of the other two sides being interconnected on and adjacent to the outer faces of the first opposite sides, the construction and arrangement of all of said triangular extensions being such as to freely escape said openings of the sides, thereby preventing hindrance to the growth of the roots of the plants.

In testimony whereof I hereunto affix my signature.

LEWIS W. LEMKE.